(12) United States Patent
Sasaki

(10) Patent No.: US 9,348,545 B2
(45) Date of Patent: May 24, 2016

(54) REDUCING WAIT TIME WHEN EXTERNAL APPARATUS USED FOR IMAGE PROCESSING

(71) Applicant: CANON KABUSHIKI KAISHA, Tokyo (JP)

(72) Inventor: Yuto Sasaki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/605,284

(22) Filed: Jan. 26, 2015

(65) Prior Publication Data
US 2015/0212781 A1    Jul. 30, 2015

(30) Foreign Application Priority Data

Jan. 27, 2014 (JP) .................................. 2014-012725
Dec. 26, 2014 (JP) .................................. 2014-266251

(51) Int. Cl.
G06F 3/12 (2006.01)

(52) U.S. Cl.
CPC ............ *G06F 3/1256* (2013.01); *G06F 3/1211* (2013.01); *G06F 3/1293* (2013.01)

(58) Field of Classification Search
None
See application file for complete search history.

(56) References Cited

U.S. PATENT DOCUMENTS

| 7,483,162 B2* | 1/2009 | Matsushima | G06F 17/30893 358/1.13 |
| 8,610,927 B2* | 12/2013 | Sweet | G06F 3/1204 358/1.13 |
| 2011/0109922 A1* | 5/2011 | Hahm | H04N 1/387 358/1.9 |
| 2012/0293820 A1* | 11/2012 | Mizoguchi | H04N 1/4433 358/1.13 |
| 2013/0155455 A1* | 6/2013 | Ueda | G06F 3/1296 358/1.15 |
| 2014/0149394 A1* | 5/2014 | Sakurai | H04L 67/2828 707/722 |
| 2015/0212781 A1* | 7/2015 | Sasaki | G06F 3/1293 358/1.15 |

FOREIGN PATENT DOCUMENTS

JP   2011131382 A   7/2011

* cited by examiner

*Primary Examiner* — Miya J Cato
(74) *Attorney, Agent, or Firm* — Canon U.S.A., Inc., IP Division

(57) ABSTRACT

An image forming apparatus that communicates with an external apparatus includes an identification unit that identifies processing target data that is not processable in the image forming apparatus, a transmission unit that transmits the processing target data to the external apparatus before reception of at least one of a print instruction and a preview display instruction with respect to the processing target data identified by the identification unit, and a receiving unit that receives processing target data that has been processed in the external apparatus.

11 Claims, 17 Drawing Sheets

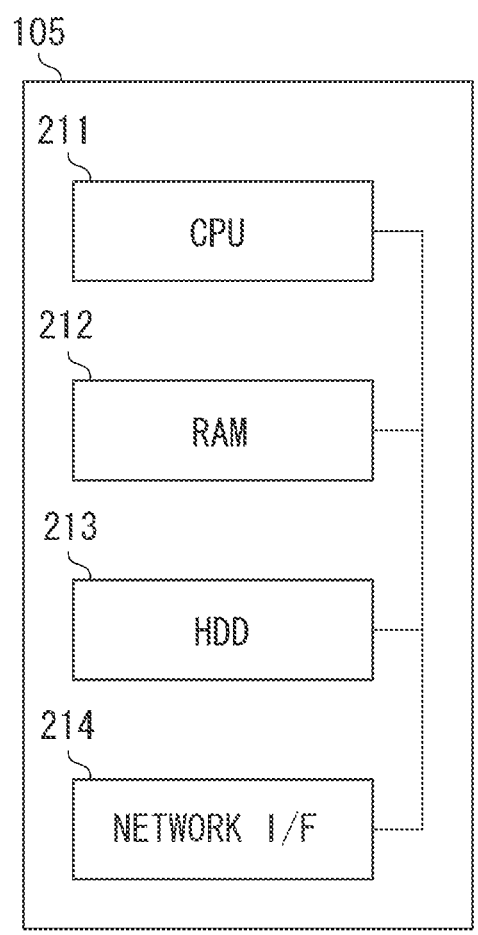

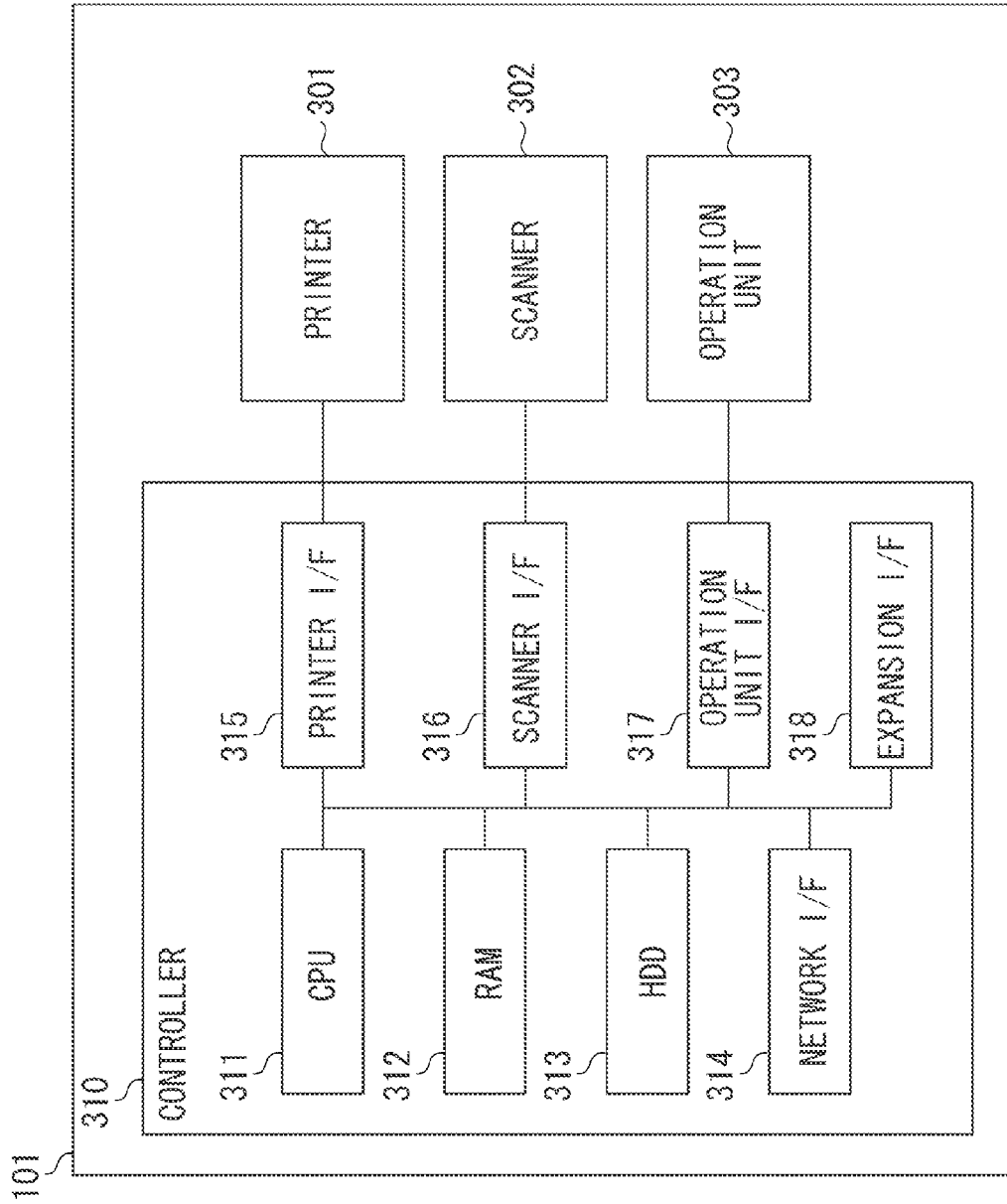

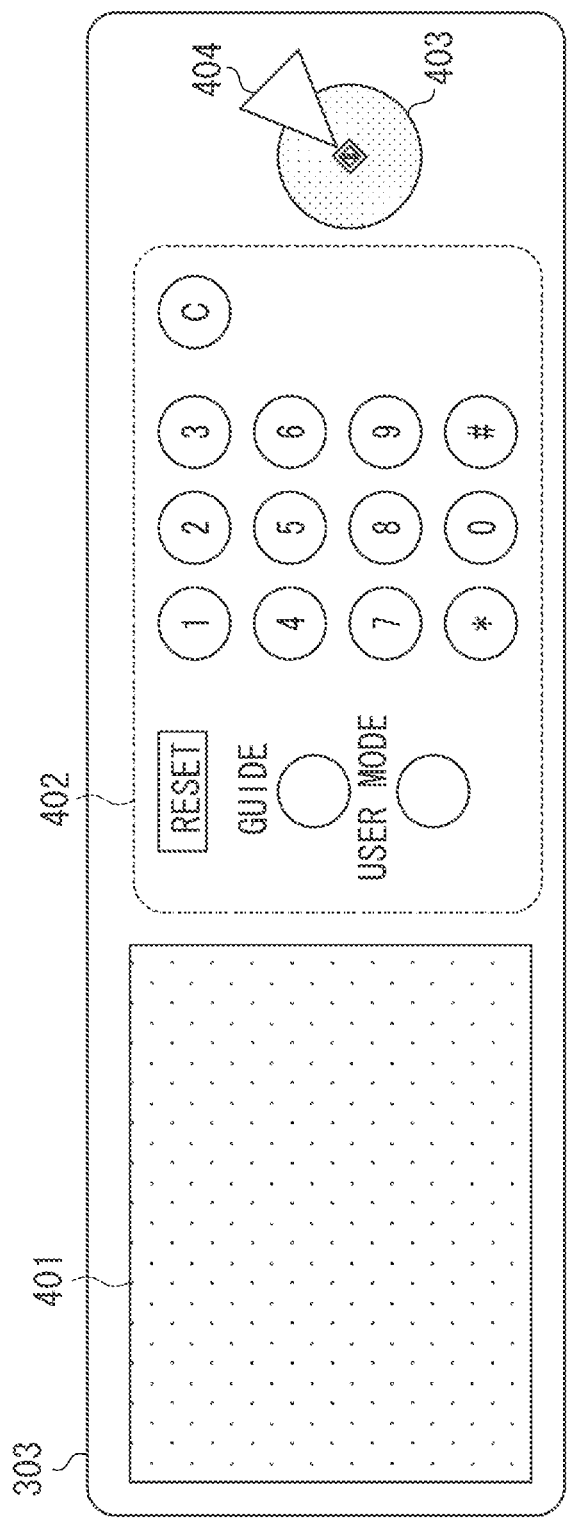

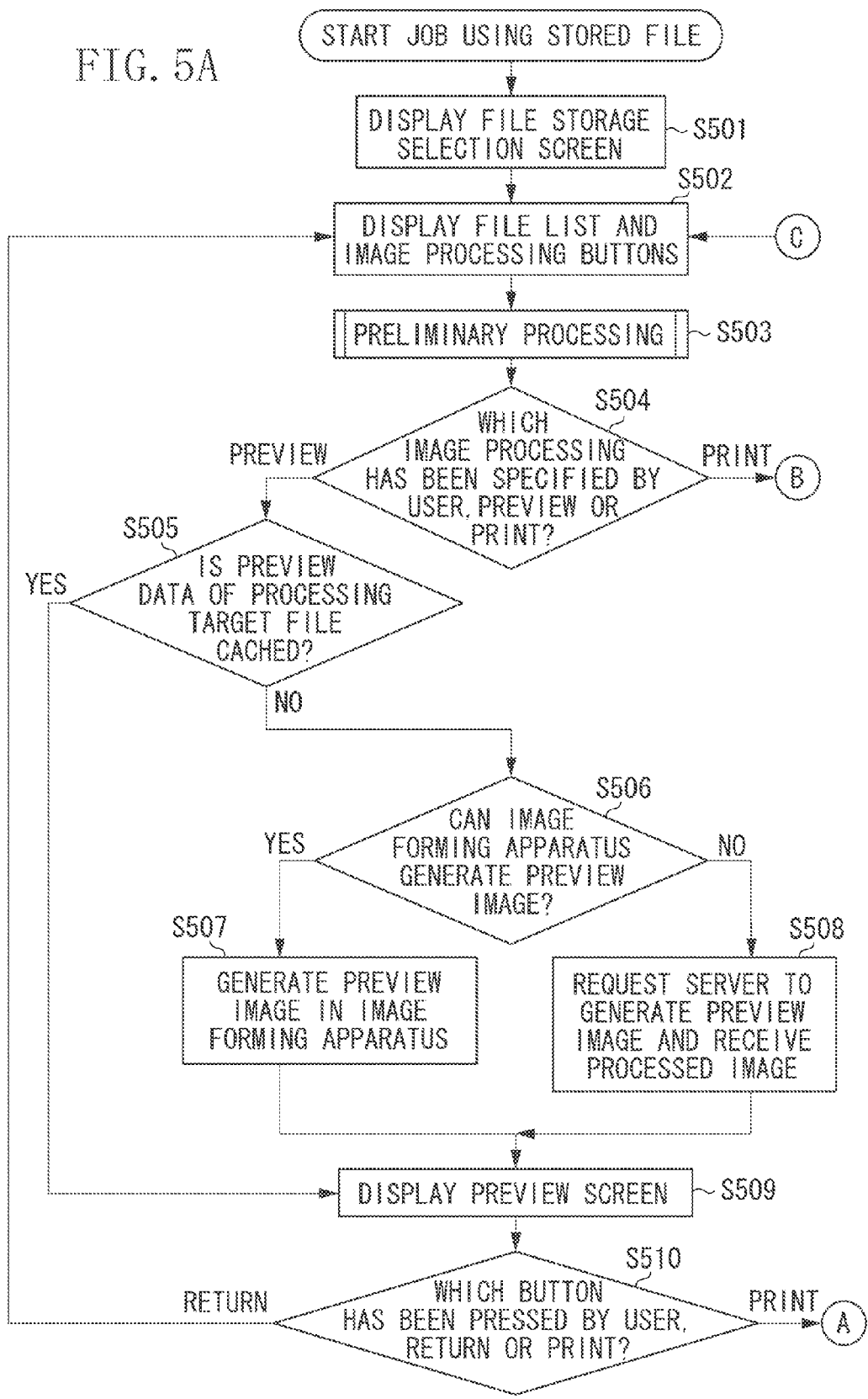

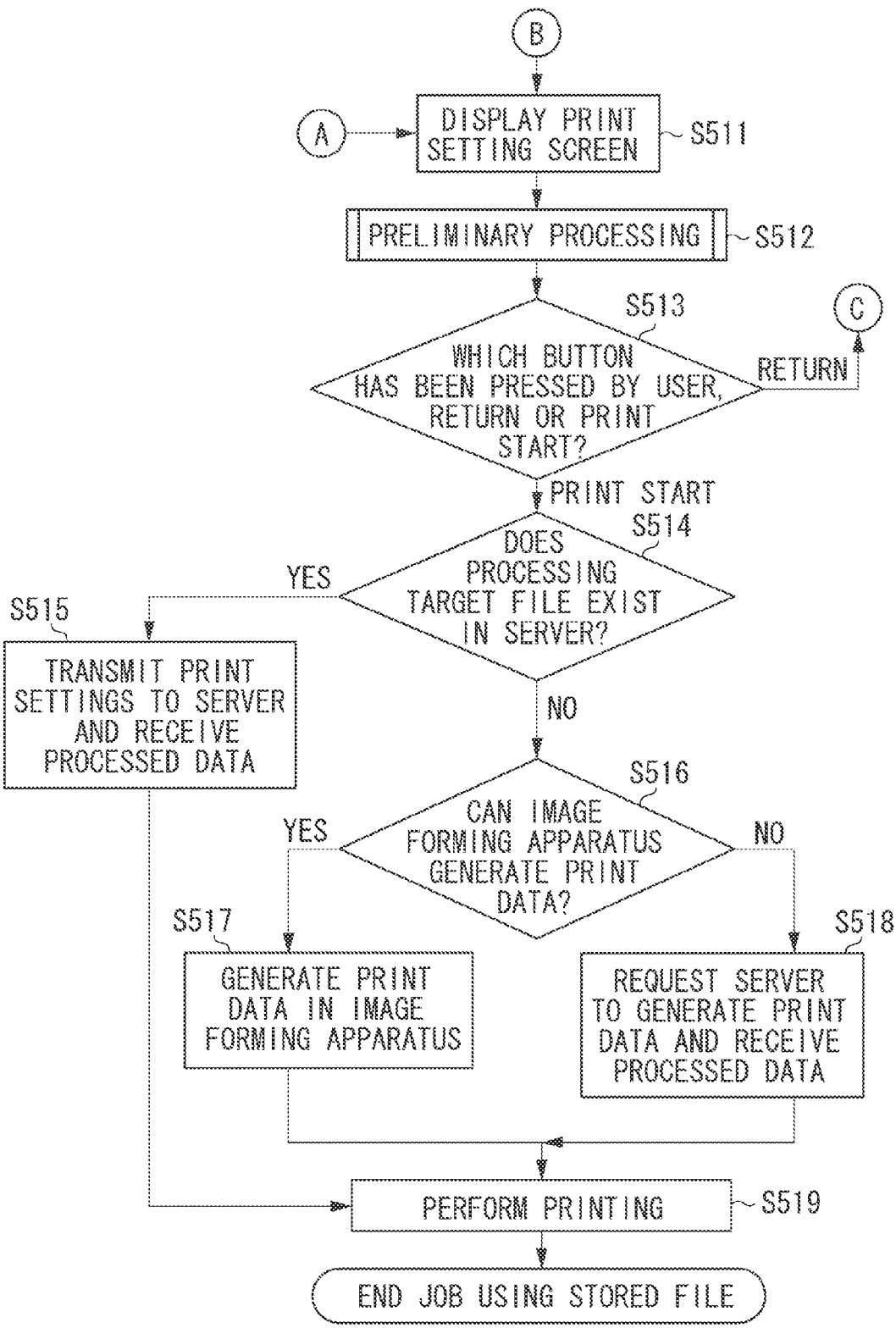

FIG. 16

| FILE NAME | DATE AND TIME OF SERVER USE | NUMBER OF TIMES OF SERVER USE |
|---|---|---|
| document1.pdf | 01/01/2013 | 6 |
| document2.docx | 02/01/2013 | 15 |
| document3.epub | 03/01/2013 | 1 |
| document4.xlsx | 04/01/2013 | 8 |

1601  1602  1603  1604

REDUCING WAIT TIME WHEN EXTERNAL APPARATUS USED FOR IMAGE PROCESSING

BACKGROUND

1. Field

Aspects of the present invention generally relate to an image forming apparatus, an information processing method, and a storage medium.

2. Description of the Related Art

According to a technique discussed in Japanese Patent Application Laid-Open No. 2011-131382, an image forming apparatus, which receives the specification of a print target file to perform printing, transmits the print target file to an image processing server. Next, the image processing server converts the print target file into print data interpretable by the image forming apparatus. The image forming apparatus receives and prints the print data converted by the image processing server.

According to the technique discussed in Japanese Patent Application Laid-Open No. 2011-131382, a print target file and a processing content are converted into print data processable by the image forming apparatus by transmitting them to an external image processing server. Consequently, due to data exchange performed between the image forming apparatus and the image processing server, there has been an issue of longer first print output time (FPOT) until job output, compared with conventional image processing performed inside an image forming apparatus.

SUMMARY

Aspects of the present invention are generally directed to a technique for improving operability by reducing the waiting time of a user as much as possible even in a case where an external apparatus is used for image processing.

According to an aspect of the present invention, an image forming apparatus that communicates with an external apparatus includes an identification unit configured to identify processing target data that is not processable in the image forming apparatus, a transmission unit configured to transmit the processing target data to the external apparatus before reception of at least one of a print instruction and a preview display instruction with respect to the processing target data identified by the identification unit, and a receiving unit configured to receive processing target data that has been processed in the external apparatus.

Further features of the present disclosure will become apparent from the following description of exemplary embodiments with reference to the attached drawings.

BRIEF DESCRIPTION OF THE DRAWINGS

FIG. 2 illustrates an example of a hardware configuration of an image processing server.

FIG. 3 illustrates an example of a hardware configuration of an image forming apparatus.

FIG. 4 illustrates an example of an operation unit of the image forming apparatus.

FIGS. 5A and 5B are flowcharts illustrating an example of information processing performed when a job is performed using a stored file.

FIG. 16 illustrates an example of an image processing server usage frequency table.

DESCRIPTION OF THE EMBODIMENTS

Various exemplary embodiments will be described in detail below with reference to the drawings.

Figure 1:
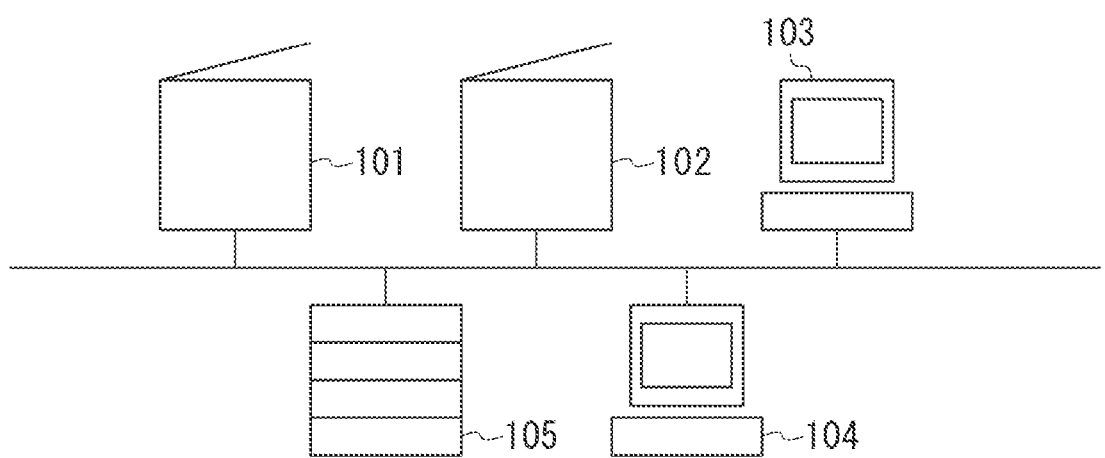
FIG. 1 illustrates an example of a system configuration of an image forming system.

FIG. 1 illustrates an example of a system configuration of an image forming system.

The image forming system includes a plurality of image forming apparatuses such as image forming apparatuses 101 and 102, information processing terminals 103 and 104, and an image processing server 105. These apparatuses are mutually connected via a network so as to be capable of communicating with each other. Hereinafter, the image forming apparatus 101 will be described as a representative of the image forming apparatuses. The network may be a local area network (LAN), the Internet, or any other types of network, as long as the apparatuses included in the image forming system can communicate with each other.

The image forming apparatus 101 can receive a print request of image data from the information processing terminal 103 or 104 and print an image. The image forming apparatus 101 can also read an image by using a scanner included in the image forming apparatus 101 and print the read image. In addition, the image forming apparatus 101 can present to a user a content in a server-message-block (SMB) shared folder in the information processing terminal 103 or 104 and a content in a universal serial bus (USB) memory connected to the image forming apparatus 101, and print a file selected by the user from the presented contents. If the image processing apparatus 101 cannot perform certain image processing, the image processing apparatus 101 can request the image processing server 105 to perform such image processing.

The image processing server 105 receives a processing target file (also referred to as processing target data) and conversion instruction data from the image forming apparatus 101, processes the processing target data as instructed, and returns output data to the image forming apparatus 101 which is a request source. The output data is an example of image data on which image processing has been performed. The image processing server 105 is an example of an external apparatus.

FIG. 2 illustrates an example of a hardware configuration of the image processing server 105.

The image processing server 105 includes a central processing unit (CPU) 211, a random access memory (RAM) 212, a hard disk drive (HDD) 213, and a network interface (I/F) 214. The CPU 211 comprehensively controls the entire image processing server 105 and controls data exchange between the RAM 212, the HDD 213, and the network I/F 214. In addition, the CPU 211 loads a control program (command) read from the HDD 213 into the RAM 212, and executes the command stored in the RAM 212.

The HDD 213 stores a control program (command) for realizing image processing that is executable by the CPU 211. Examples of the image processing include generation of a preview file and a print file. In addition, as needed, the HDD 213 can store information about a file format processable by the image processing server 105 and data received from the image forming apparatuses such as processing content instruction data and processing target data.

The RAM 212 expands a command stored in the HDD 213 so that the CPU 211 can read the command. In addition, the RAM 212 can store various types of data needed for executing the command.

The network I/F 214 is an I/F for performing network communication with other apparatuses in the image forming system. The network I/F 214 notifies the CPU 211 of reception of data and transmits data on the RAM 212 to the network.

The CPU 211 performs processing on the basis of the control program (command) stored in the HDD 213 or the like, thereby realizing functions of the image processing server 105.

FIG. 3 illustrates an example of a hardware configuration of the image forming apparatus 101.

The image forming apparatus 101 includes a controller 310, a printer 301, a scanner 302, and an operation unit 303. The controller 310 includes a CPU 311, a RAM 312, an HDD 313, a network I/F 314, a printer I/F 315, a scanner I/F 316, an operation unit I/F 317, and an expansion I/F 318. The CPU 311 can exchange data with the RAM 312, the HDD 313, the network I/F 314, the printer I/F 315, the scanner I/F 316, and the operation unit I/F 317. In addition, the CPU 311 loads a command read from the HDD 313 into the RAM 312, and executes the command stored in the RAM 312.

The HDD 313 can store a command executable by the CPU 311, a setting value used in the image forming apparatus 101, and data relating to processing requested by the user, for example.

The RAM 312 expands a command stored in the HDD 313 so that the CPU 311 can read the command. In addition, the RAM 312 can store various types of data needed for executing the command.

The network I/F 314 is an I/F for performing network communication with other apparatuses in the image forming system. The network I/F 314 notifies the CPU 311 of reception of data and transmits data on the RAM 312 to the network.

The printer I/F 315 is an I/F for transmitting image data transmitted from the CPU 311 to the printer 301, and transferring a printer state received from the printer 301 to the CPU 311.

The scanner I/F 316 is an I/F for transmitting an image read instruction transmitted from the CPU 311 to the scanner 302, transferring image data received from the scanner 302 to the CPU 311, and transferring a scanner state received from the scanner 302 to the CPU 311.

The operation unit I/F 317 is an I/F for transferring an instruction input from the user via the operation unit 303 to the CPU 311, and transferring screen information for the operation of the user to the operation unit 303.

The printer 301 prints image data received from the printer I/F 315 on paper, and transfers a printer state to the printer I/F 315.

The scanner 302 reads paper placed thereon in accordance with an image read instruction received from the scanner I/F 316, converts the read image into digital data, and transfers the data to the scanner I/F 316. In addition, the scanner 302 transfers a scanner state to the scanner I/F 316.

The operation unit 303 enables the user to operate the image forming apparatus 101. For example, the operation unit 303 includes a liquid crystal screen having a touch panel, providing the user with an operation screen as well as receiving operations from the user.

The expansion I/F 318 enables the image forming apparatus 101 to connect to external apparatuses. For example, the expansion I/F 318 includes a USB format I/F so as to connect an external storage apparatus such as a USB memory to the image forming apparatus 101, and perform reading and writing of data.

The CPU 311 performs processing on the basis of the control program (command) stored in the HDD 313 or the like, thereby realizing functions of the image forming apparatus 101 and processing in the following flowcharts performed by the image forming apparatus 101.

FIG. 4 illustrates an example of the operation unit 303 of the image forming apparatus 101.

The operation unit 303 includes a touch panel screen 401, setting keys 402, a cancel key 404, and a start key 403. The user makes settings for each job by using the touch panel screen 401 and the setting keys 402. By pressing the start key 403, the user instructs the image forming apparatus 101 to start the job. By pressing the cancel key 404, the user can cancel a job that has been once started.

Next, information processing performed in a case where printing is performed using a processing target file stored inside or outside the image forming apparatus 101 will be described. The processing target file refers to bitmap data stored in a bitmap format, general-purpose format data stored in a general-purpose format such as office open extensible markup language (ooxml) and electronic publication (ePUB), and print data stored in a page-description language (PDL) format. In addition, the processing target file as described above is a file on which processing such as print or preview processing is to be performed.

FIGS. 5A and 5B are flowcharts illustrating an example of information processing performed when a job is performed using a stored file. A flow of job execution using a normal external server will be described with reference to the operation unit 303 illustrated in FIG. 4 and the flowcharts in FIGS. 5A and 5B.

If the CPU 311 detects that the user has selected use of a stored file via the touch panel screen 401, in step S501, the CPU 311 displays a file storage selection screen 601, and receives selection of a storage from the user.

Figure 6:
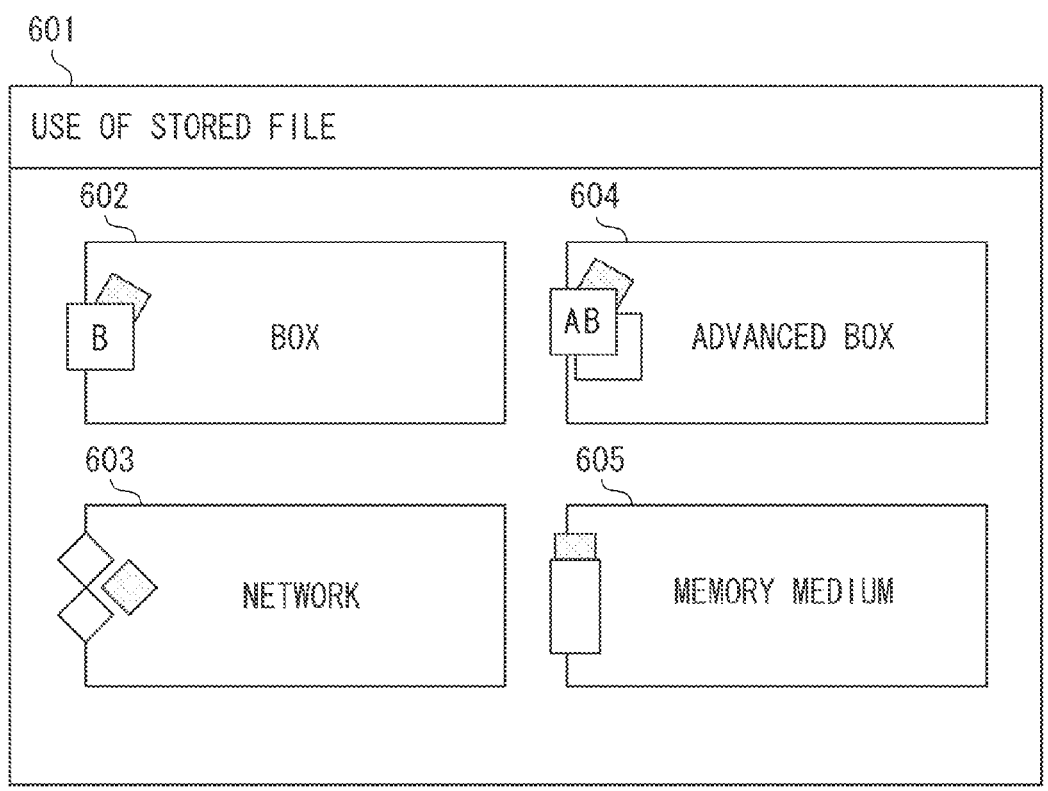
FIG. 6 illustrates an example of a file storage selection screen.

FIG. 6 illustrates an example of the file storage selection screen 601. The file storage selection screen 601 includes a BOX button 602, a NETWORK button 603, an ADVANCED BOX button 604, and a MEMORY MEDIUM button 605. The BOX button 602 represents use of bitmap data stored in a bitmap format in the HDD 313 of the image forming apparatus 101. The NETWORK button 603 represents use of a predetermined SMB shared folder in the information processing terminal 103 or the like. The ADVANCED BOX button 604 represents use of general-purpose format data in the HDD 313. The MEMORY MEDIUM button 605 represents use of data stored in a USB memory connected to the image forming apparatus 101. The file storages are not limited to these file storages. Other file storages may be used as long as the file storages are accessible from the image forming apparatus 101.

If the CPU 311 detects a file storage selection from the user in step S501, in step S502, the CPU 311 displays a list of processing target files stored in the selected file storage and image processing buttons.

Figure 7:
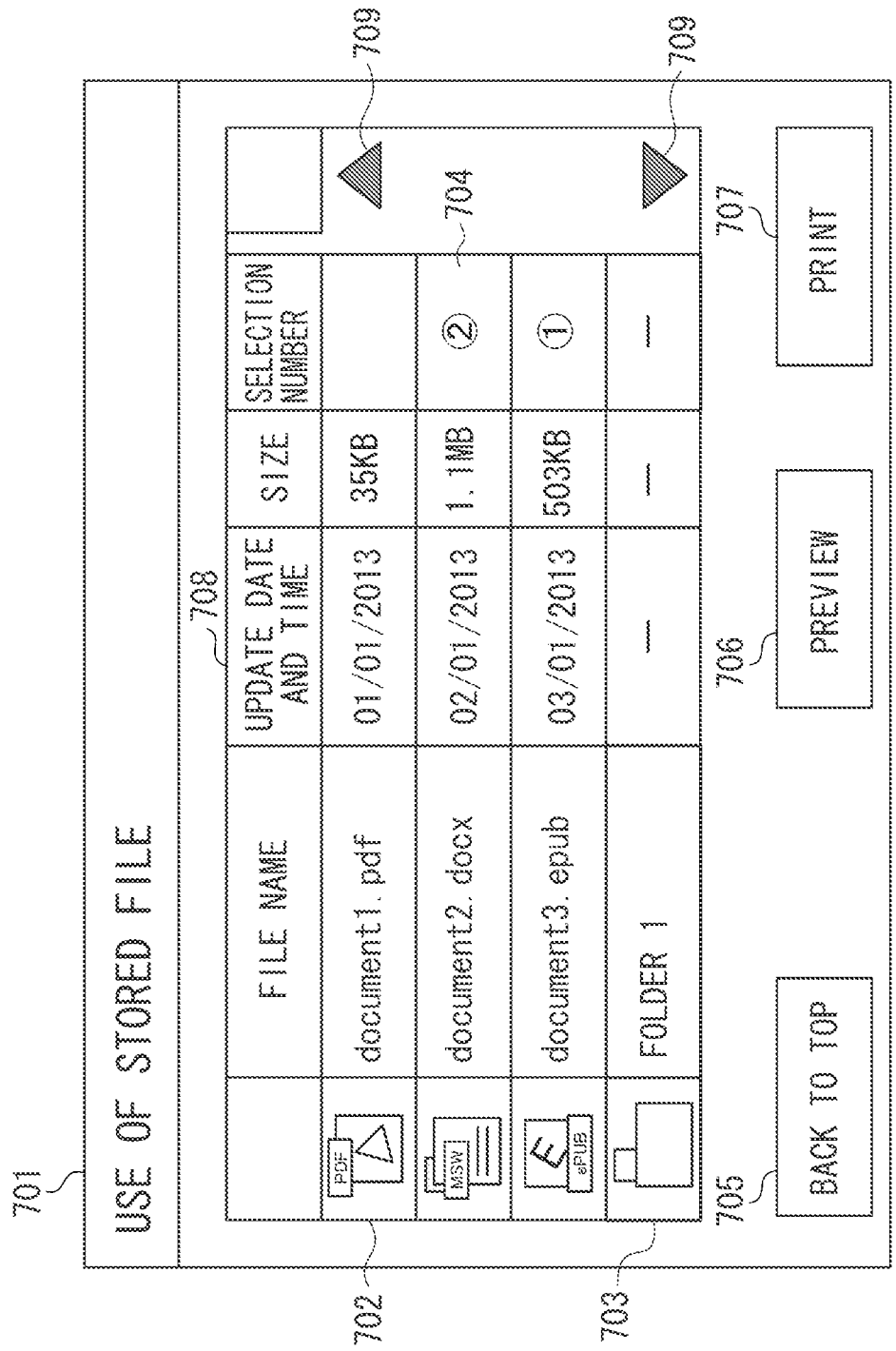
FIG. 7 illustrates an example of a processing target file list display screen.

FIG. 7 illustrates an example of a processing target file list display screen 701. On this screen example, a file name, update date and time, and a size of each processing target file 702 are displayed, and the selection from the user is received.

In step S503, the CPU 311 determines whether to perform preliminary processing when the screen in FIG. 7 is displayed. The determination of the preliminary processing and a preliminary processing content will be described below with reference to FIG. 12. Even if the CPU 311 determines to perform preliminary processing in step S503, the CPU 311 cannot determine, at this stage, which file on the file list the user desires to be processed. Therefore, a file to be subjected to preliminary processing in the image processing server 105 needs to be determined based on certain conditions.

Next, conditions used for determining a file on which the preliminary processing is to be performed will be described.

As a first condition, the preliminary processing target file is determined on the basis of update date and time. When the user accesses a file from a terminal capable of accessing the file, such as a personal computer (PC), and stores the file after editing the file, date and time on which the file is stored is added to the file as update date and time. The CPU 311 displays the update date and time added to the file as update date and time 708 in the processing target file list display screen 701. The CPU 311 acquires a file having the latest update date and time among the files in the target storage, and determines the acquired file to be the preliminary processing target file. Examples of advantages of selecting a preliminary processing target file by using the first condition include that a use case where a file is printed after the user edits the file can be accommodated. Many users performs a work flow of first performing some kind of editing operation on a file and next submitting or storing and managing the file as a print product. Thus, by using the first condition, the image forming apparatus 101 can preliminarily process a file having the latest update date and time preferentially, so that the image forming apparatus 101 can provide the user with an output product more quickly.

As a second condition, the preliminary processing target file is determined on the basis of date and time of server use.

FIG. 16 illustrates an example of an image processing server usage frequency table 1601. A method for determining a preliminary processing target file on the basis of date and time of server use will be described with reference to FIG. 16. First, the CPU 311 updates the image processing server usage frequency table 1601 in the HDD 313 after printing or previewing using the image processing server 105 is performed. More specifically, if the image processing server 105 processes a file having a file name 1602, the CPU 311 enters date and time of server use 1603. Next, the CPU 311 updates a number of times of server use 1604. Next, after the CPU 311 detects the selection of a file storage on the file storage selection screen 601, the CPU 311 determines a file having the latest date and time of server use 1603 in the image processing server usage frequency table 1601 to be the preliminary processing target file. Selecting a preliminary processing target file by using the second condition is advantageous in a case where the image processing server 105 performs a plurality of processing operations on a file, for example, in a case where the image processing server 105 performs a preview operation before a printing operation, in that such a file can be preliminarily processed preferentially. As a result, the image forming apparatus 101 can provide the user requesting the above processing with an output product more quickly.

As a third condition, the preliminary processing target file is determined on the basis of the number of times of server use. The third condition will be described with reference to the image processing server usage frequency table 1601 illustrated in FIG. 16. As described above with reference to FIG. 16, the number of times the image processing server 105 has been used for processing on each target file is input in the number of times of server use 1604. The CPU 311 preferentially determines a file having the largest number of times of server use 1604 to be a preliminary processing target file. Examples of advantages of selecting a preliminary processing target file by using the third condition include that the image forming apparatus 101 can provide, more quickly, an output product of a file that needs to be printed regularly.

In addition, the number of files on which preliminary processing is to be performed on the basis of any of the first to third conditions is determined by the CPU 311 acquiring a transmission file number set in advance in the HDD 313. The transmission file number in the HDD 313 may be a predetermined value or may be settable by a system administrator or the like.

As a fourth condition, the preliminary processing target file is determined on the basis of a hierarchical level. Since the processing target file list display screen 701 has a tree structure, a folder 703 may be included. If the CPU 311 detects the press of the folder 703, the CPU 311 performs control so as to display the content of the folder 703. A screen configuration under the folder is similar to that of the processing target file list display screen 701. In addition, if the user scrolls the list by pressing any of display scroll buttons 709, files that are not being displayed in the processing target file list display screen 701 can be displayed. The files that are being displayed in the processing target file list display screen 701 are determined to be preliminary processing target files. Examples of advantages of using the fourth condition include that, by performing preliminary processing only on the folder including the file on which the user intends to perform processing, server resources can be efficiently used and the image forming apparatus 101 can provide the user with an output product more quickly. In addition, as the fourth condition, another hierarchical level on which preliminary processing is to be performed can be set. Alternatively, only the files displayed in the processing target file list display screen 701 may be preliminarily transmitted and files newly displayed as the user presses any of the scroll buttons 709 may be sequentially transmitted. In addition, a condition other than the first to fourth conditions may be used for determining a file to be transmitted preliminarily. Hereinafter, this timing will be referred to as a first preliminary processing timing.

Next, the CPU 311 detects selection of a processing target file from the user. The CPU 311 records the order in which files are selected and allocates selection numbers 704 according to the selection order. The CPU 311 refers to the selection numbers 704 and performs the jobs in numerical order. In step S503, even if the user has selected files, namely, even files are allocated with the selection numbers 704, the CPU 311 determines whether to perform preliminary processing on the selected files. The determination of preliminary processing and a preliminary processing content will be described below with reference to FIG. 12. Since, at this point, it can be determined that the user has an intention to perform image processing on the selected files, these files are more likely to be used than at the first preliminary processing timing. This timing will be referred to as a second preliminary processing timing. Even in this state, the CPU 311 determines whether to perform preliminary processing. If the CPU 311 detects the press of a "BACK TO TOP" button 705 on this screen, the CPU 311 performs control so as to display a top screen.

In step S504, the CPU 311 determines which image processing the user has selected. If the CPU 311 detects the press of a PREVIEW button 706 while a processing target file is being selected ("PREVIEW" in step S504), the processing proceeds to step S505. In step S505, the CPU 311 determines whether a preview image of the processing target file exists in the HDD 313 of the image forming apparatus 101. In addition, if the PREVIEW button 706 is pressed, the CPU 311 determines that a preview display instruction is received. In step S505, if the CPU 311 determines that the preview image exists in the HDD 313 (YES in step S505), the processing proceeds to step S509. In step S509, the CPU 311 performs control so as to display a preview screen using the preview image. In contrast, if the preview image of the processing target file does not exist (NO in step S505), in step S506, the CPU 311 determines whether the image forming apparatus 101 can generate the preview image. For example, the CPU 311 determines whether the image forming apparatus 101 can generate the preview image, on the basis of the type of the file or the like.

In step S506, if the CPU 311 determines that the image forming apparatus 101 can generate the preview image (YES in step S506), the processing proceeds to step S507. In step S507, the CPU 311 performs control so as to perform image processing for generating the preview image of the processing target file, in the image forming apparatus 101. Next, in step S509, the CPU 311 displays the preview image generated in step S507 on the touch panel screen 401. In contrast, in step S506, if the CPU 311 determines that the image forming apparatus 101 cannot generate the preview image (NO in step S506), the processing proceeds to step S508. In step S508, the CPU 311 requests the image processing server 105 to generate the preview image and receives the converted image from the image processing server 105. Next, in step S509, the CPU 311 performs control so as to display the preview image on the touch panel screen 401. A processing method for requesting the image processing server 105 to generate the image will be described below with reference to FIG. 12.

Figure 8:
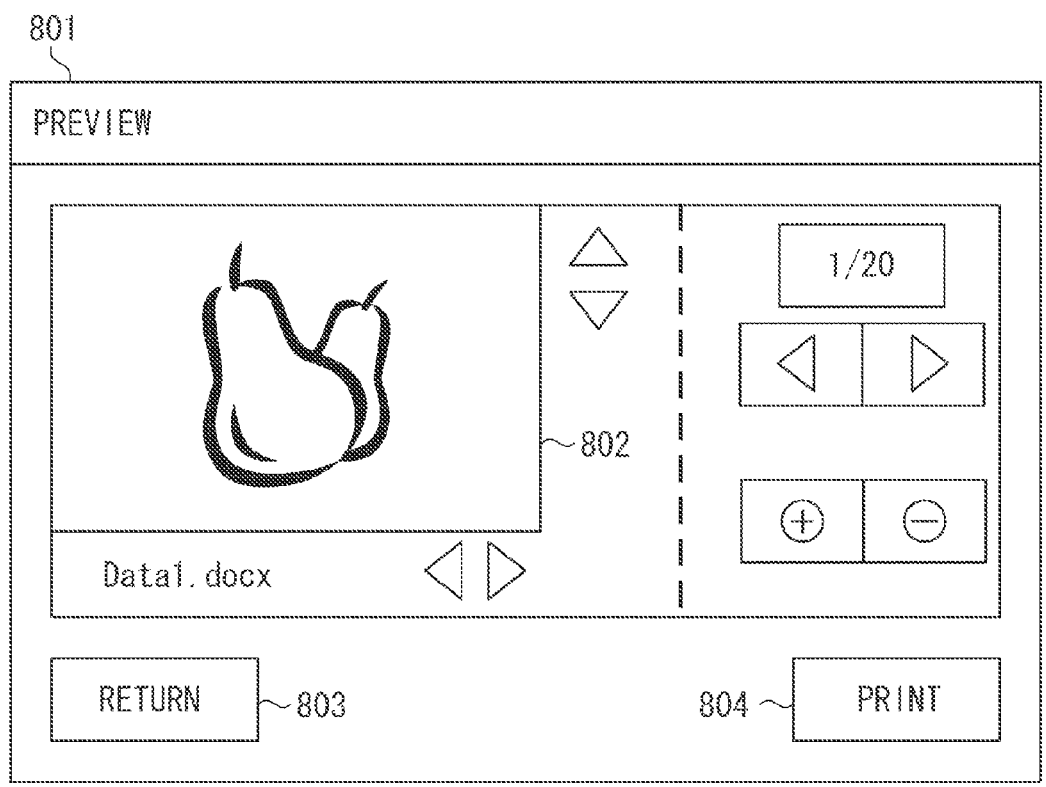
FIG. 8 illustrates an example of a preview image display screen.

FIG. 8 illustrates an example of a preview image display screen 801. The preview image display screen 801 includes a preview image 802 of a selected processing target file, a RETURN button 803, and a PRINT button 804. In step S510, the CPU 311 determines which button has been pressed by the user. If the CPU 311 detects the press of the Return button 803 ("RETURN" in step S510), the processing returns to step S502. In step S502, the CPU 311 displays the processing target file list on the processing target file display screen 701. In contrast, if the CPU 311 detects the press of the PRINT button 707 on the processing target file display screen 701 ("PRINT" in step S504) or the PRINT button 804 on the preview image display screen 801 ("PRINT" in step S510), the processing proceeds to step S511. In step S511, the CPU 311 performs control so as to display a print setting screen 901.

In step S512, the CPU 311 determines whether to perform preliminary processing on a selected file even in this state. The determination of preliminary processing and a preliminary processing content at this stage will be described below.

Since, at this timing, the user has expressed his/her intention to perform print settings for the processing target file, the file at this timing is more likely to be used than at the first and second preliminary processing timings. This timing will be referred to as a third preliminary processing timing.

Figure 9:
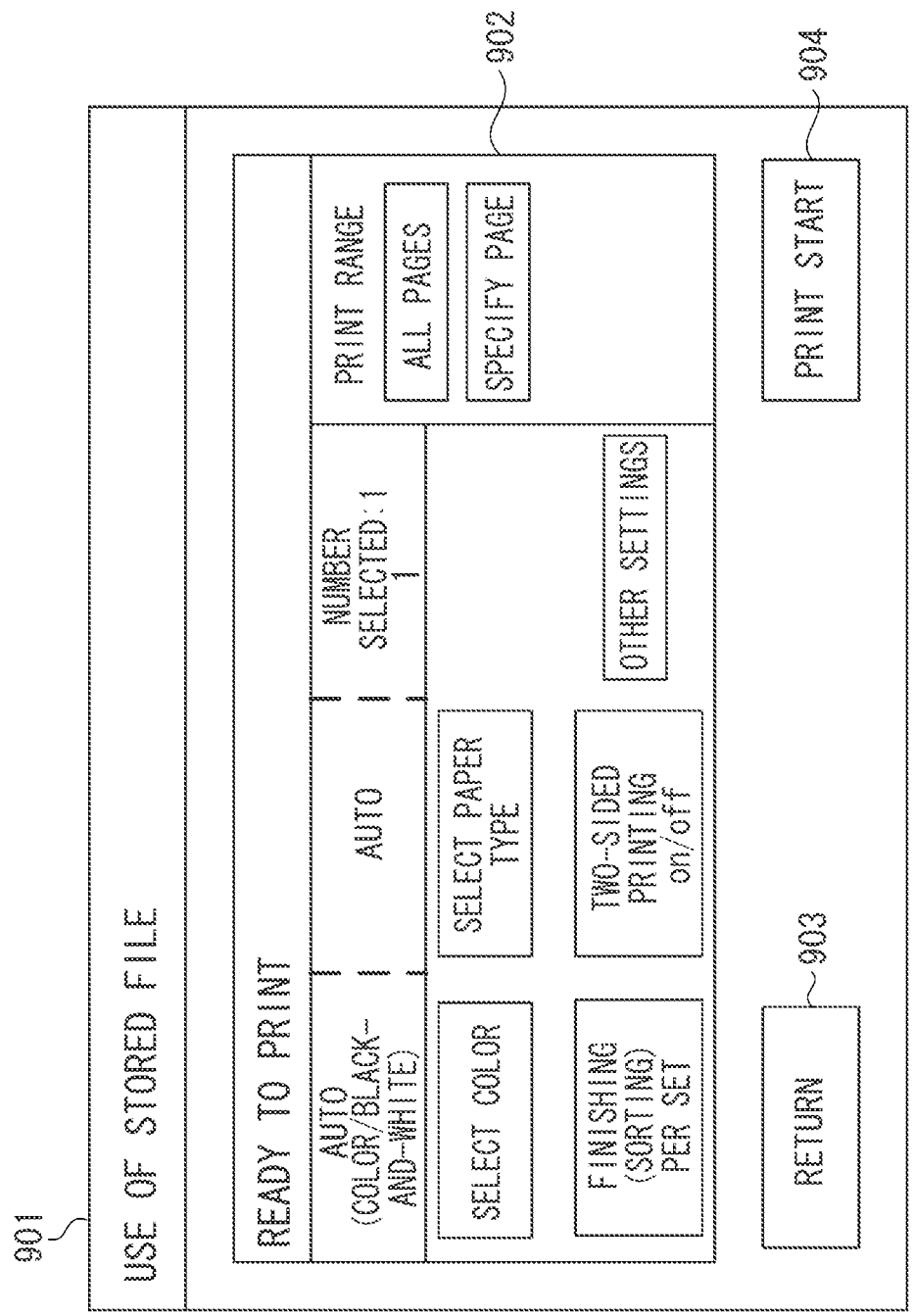
FIG. 9 illustrates an example of a print setting screen.

FIG. 9 illustrates an example of the print setting screen 901. The print setting screen 901 includes various print setting items 902, a RETURN button 903, and a PRINT START button 904. If the CPU 311 detects print settings from the user via the press of the setting items 902, the CPU 311 performs appropriate settings suitable for the selected setting items. Various setting items relating to printing such as a single-sided/two-sided printing setting, an aggregate printing (4 in 1, for example) setting, and a bookbinding printing setting can be used as the setting items.

Next, in step S513, the CPU 311 determines which buttons has been pressed by the user. If the CPU 311 detects the press of the RETURN button 903 ("RETURN" in step S513), the processing returns to step S502. In step S502, the CPU 311 displays the processing target file list display screen 701.

In contrast, in step S513, if the CPU 311 detects the press of the PRINT START button 904 or the start key 403 ("PRINT START" in step S513), the processing proceeds to step S514. In step S514, the CPU 311 determines whether the processing target file exists in the image processing server 105. For example, the CPU 311 stores information about the file transmitted to the image processing server 105 in the RAM 312 or the HDD 313 and, on the basis of the information, determines whether the processing target file exists in the image processing server 105.

In step S514, if the CPU 311 determines that the processing target file exists in the image processing server 105 (YES in step S514), the processing proceeds to step S515. In step S515, the CPU 311 transmits the print settings to the image processing server 105. If the CPU 311 receives processed print data from the image processing server 105, in step S519, the CPU 311 performs printing by using the print data.

In contrast, if the processing target file does not exist in the image processing server 105 (NO in step S514), the processing proceeds to step S516. In step S516, the CPU 311 determines whether the image forming apparatus 101 can generate print data. For example, the CPU 311 determines whether the image forming apparatus 101 can generate print data, on the basis of the type of file. In step S516, if the CPU 311 determines that the image forming apparatus 101 can generate print data (YES in step S516), the processing proceeds to step S517. In step S517, the CPU 311 performs control so as to generate print data in the image forming apparatus 101. Next, in step S519, the CPU 311 performs printing by using the generated print data. In contrast, in step S516, if the CPU 311 determines that the image forming apparatus 101 cannot generate print data (NO in step S516), the processing proceeds to step S518. In step S518, the CPU 311 requests the image processing server 105 to perform image processing. Next, in step S519, the CPU 311 performs printing by using print data received from the image processing server 105. A processing method for requesting the image processing server 105 to generate the image will be described below.

Next, an image processing sequence performed using the image processing server 105 will be described.

Figure 10:
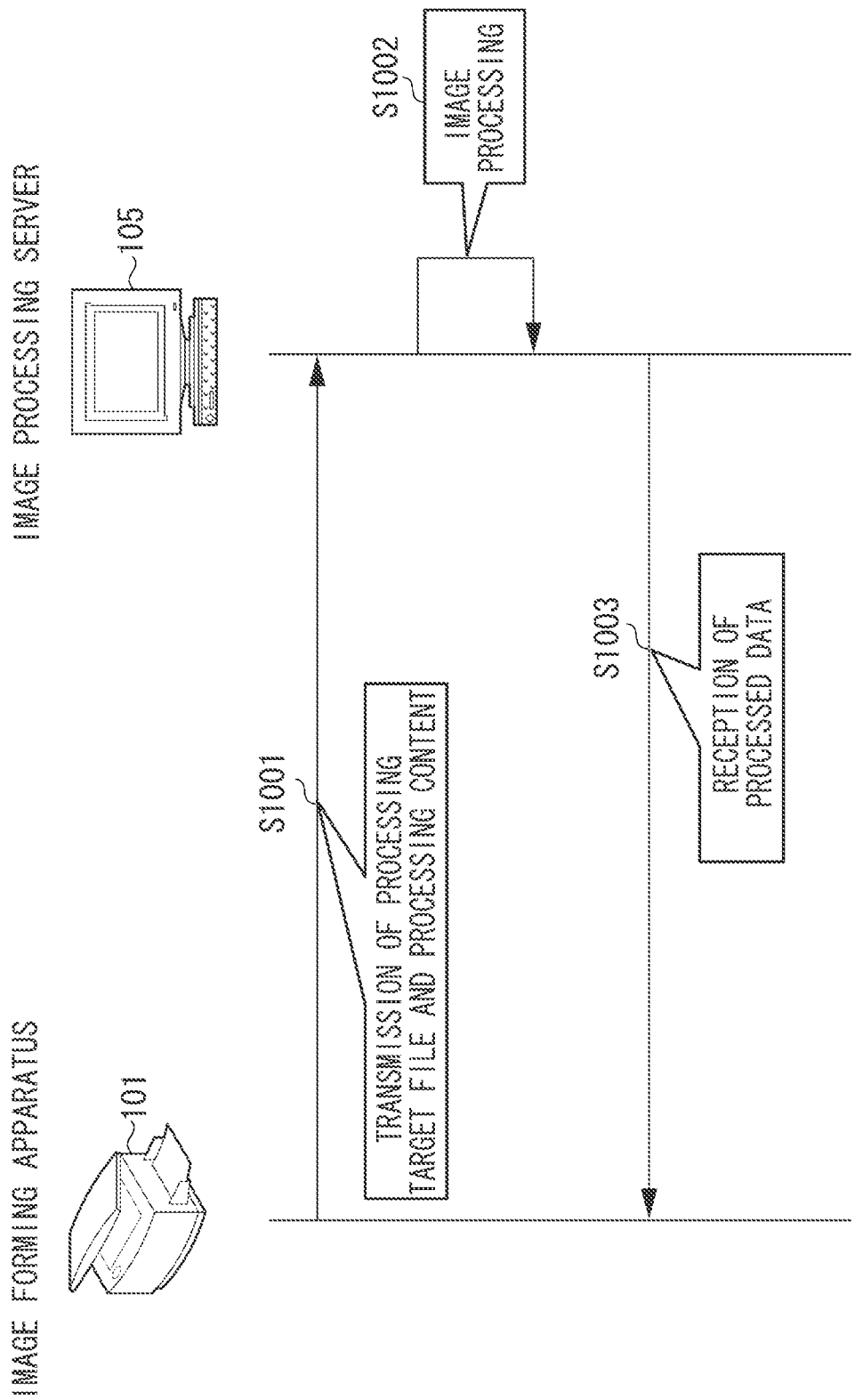
FIG. 10 illustrates an example of an image processing sequence performed in a case where a processing target file and conversion instruction data are simultaneously transmitted to the image processing server.

FIG. 10 illustrates an example of an image processing sequence performed in a case where the image forming apparatus 101 simultaneously transmits a processing target file and conversion instruction data to the image processing server 105.

First, in step S1001, the image forming apparatus 101 transmits a processing target file and conversion instruction data.

If the image processing server 105 receives the processing target file and the conversion instruction data, in step S1002, the image processing server 105 interprets the conversion instruction data, and performs image processing.

In step S1003, the image processing server 105 transmits processed data to the image forming apparatus 101.

The image forming apparatus 101 performs subsequent processing by using the received processed data.

Figure 11:
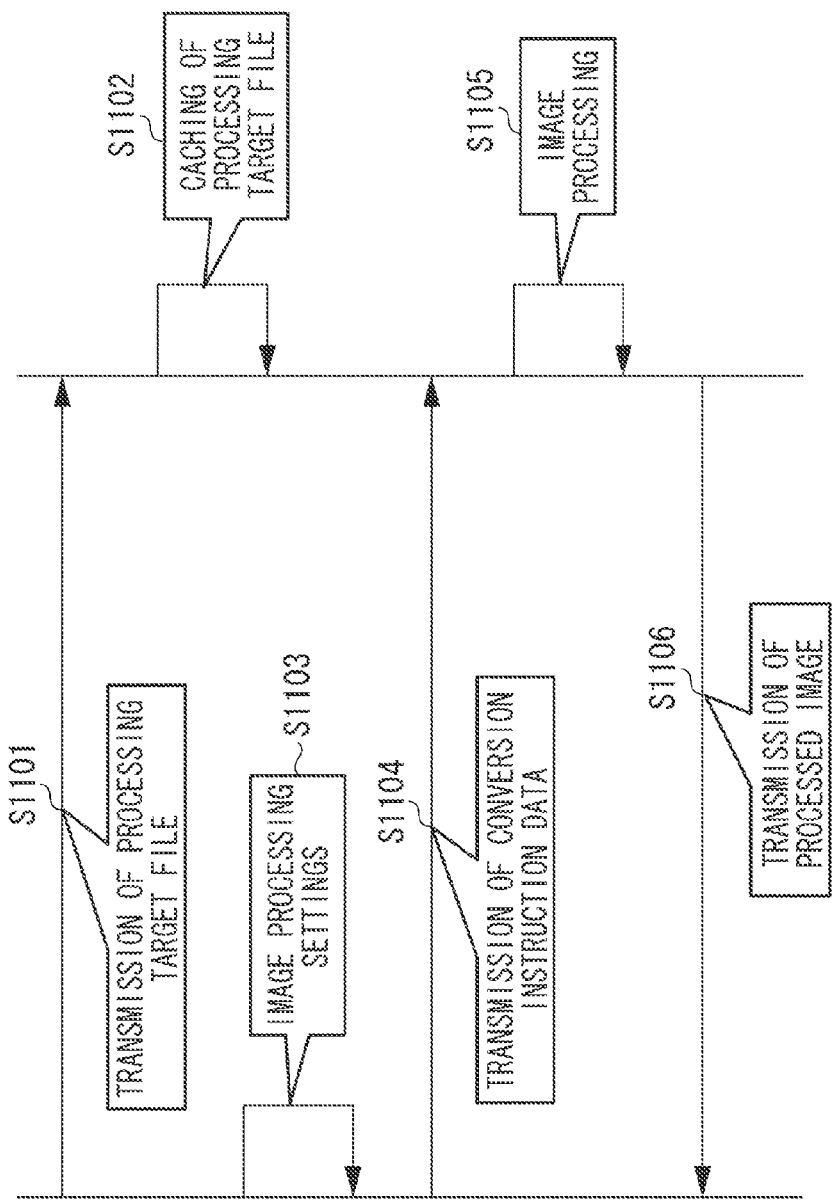
FIG. 11 illustrates an example of an image processing sequence performed in a case where a processing target file is preliminarily transmitted and conversion instruction data is subsequently transmitted.

FIG. 11 illustrates an example of an image processing sequence performed in a case where a processing target file is preliminarily transmitted and conversion instruction data is subsequently transmitted First, in step S1101, the image forming apparatus 101 transmits a processing target file to the image processing server 105.

In step S1102, the image processing server 105 caches the received processing target file.

In step S1103, the image forming apparatus 101 detects image processing settings from the user. In step S1104, the image forming apparatus 101 then transmits conversion instruction data in accordance with the image processing settings to the image processing server 105.

In step S1105, the image processing server 105 interprets the conversion instruction data and performs image processing on the processing target file that has previously been cached.

Next, in step S1106, the image processing server 105 transmits processed data to the image forming apparatus 101.

The image forming apparatus 101 performs subsequent processing by using the received processed data.

Next, a processing flow used when preliminary processing is performed will be described.

In a first exemplary embodiment, an example in which data to be initially-preliminarily transmitted is determined in accordance with the format of a processed file will be described.

Figure 12:
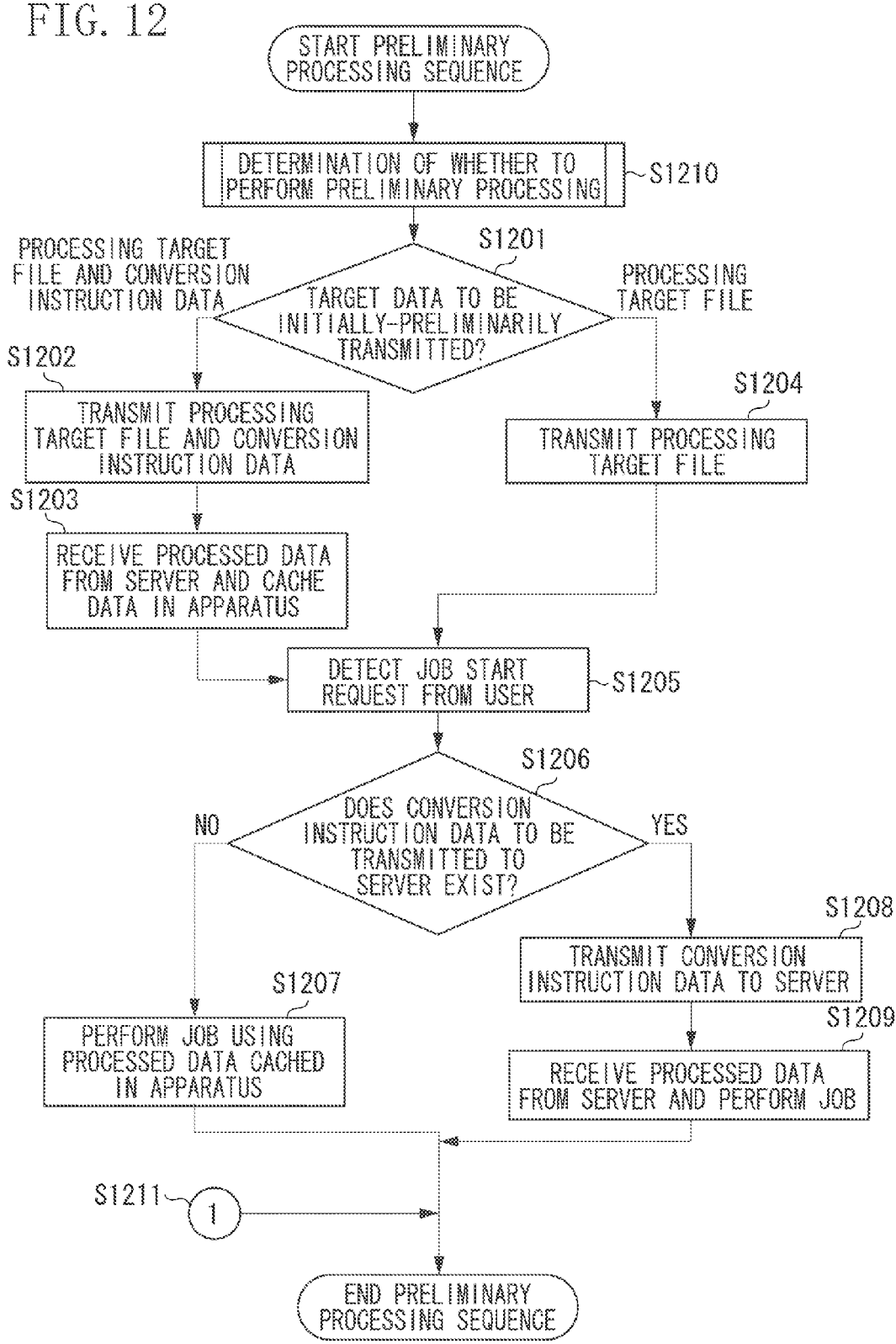
FIG. 12 is a flowchart illustrating an example of preliminary processing.

FIG. 12 is a flowchart illustrating an example of preliminary processing.

First, processing for preliminarily generating preview data will be described with reference to FIG. 12. In step S1210, the CPU 311 determines whether to perform preliminary processing at the timings illustrated in FIGS. 5A and 5B.

Figure 13:
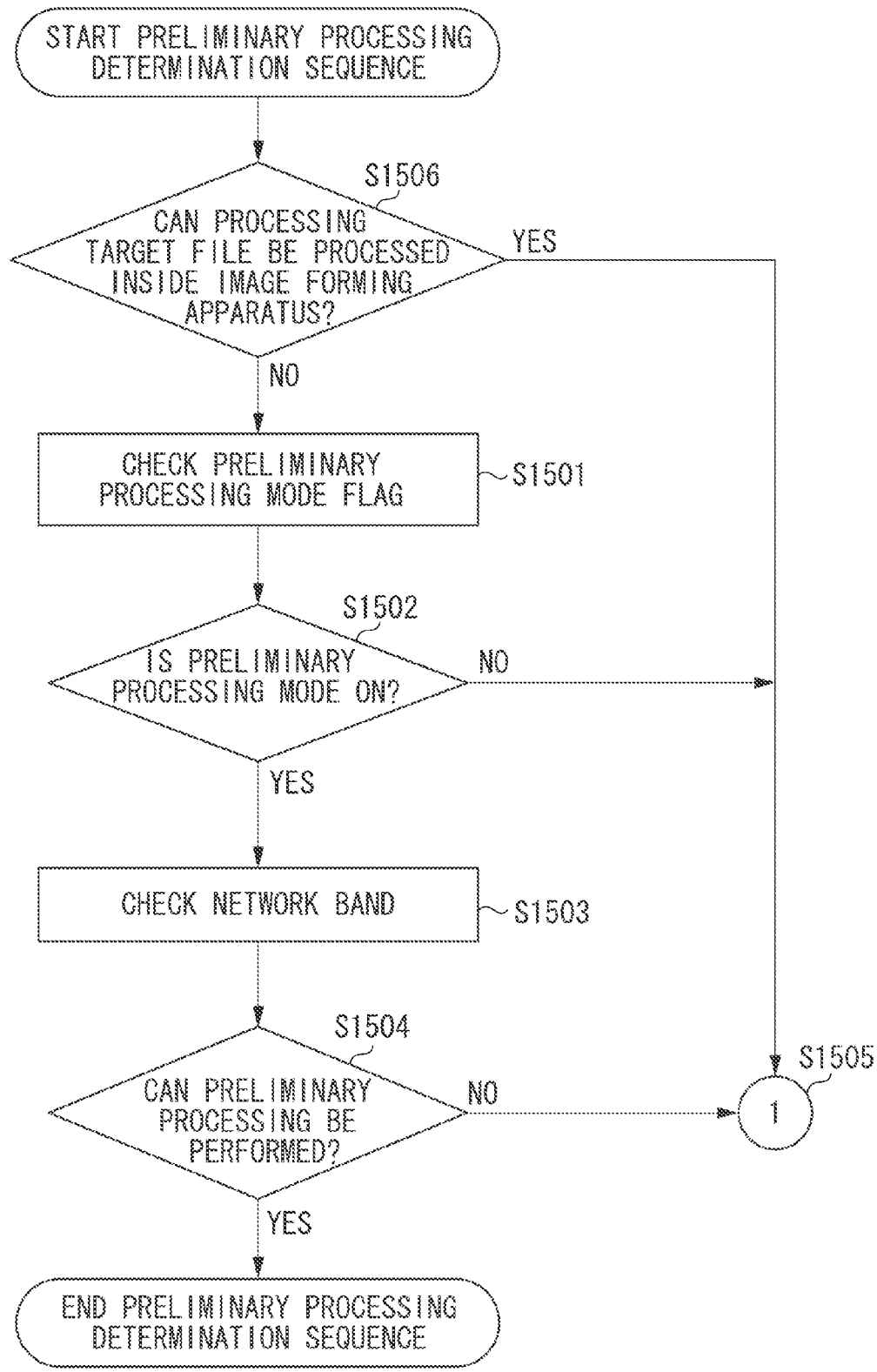
FIG. 13 is a flowchart illustrating an example of processing for determining whether to perform the preliminary processing.

FIG. 13 is a flowchart illustrating an example of processing for determining whether to perform preliminary processing, the flowchart corresponding to step S1210.

First, in step S1506, the CPU 311 determines whether the processing target file can be processed inside the image forming apparatus 101. For example, the CPU 311 determines whether the processing target file can be processed inside the image forming apparatus 101, on the basis of the type of the file (e.g., the extension of the file). In step S1506, if the CPU 311 determines that the processing target file is processable (YES in step S1506), the processing proceeds to step S1505 (S1211), and in such a case, the CPU 311 does not perform preliminary processing. In contrast, in step S1506, if the CPU 311 determines that the processing target file is not processable (NO in step S1506), the processing proceeds to step S1501. In step S1501, the CPU 311 checks a preliminary processing mode flag managed in the HDD 313. The CPU 311 can set this flag in the HDD 313 in accordance with a setting operation by the user or an administrator received via the operation unit 303.

In step S1502, the CPU 311 determines whether the preliminary processing mode flag is ON. If the preliminary processing mode flag is OFF (NO in step S1502), in step S1505, the CPU 311 determines not to perform preliminary processing, and in step S1211, the CPU 311 does not perform preliminary processing. In contrast, in step S1502, if the CPU 311 determines that the preliminary processing mode flag is ON (YES in step S1502), the processing proceeds to step S1503. In step S1503, the CPU 311 then checks a network band.

Next, in step S1504, on the basis of the check result, the CPU 311 determines whether preliminary processing can be performed. If the CPU 311 determines that preliminary processing cannot be performed (namely, if the communication speed is equal to or faster than a predetermined value (NO in step S1504)), in step S1505, the CPU 311 determines not to perform preliminary processing, and in step S1211, the CPU 311 does not perform preliminary processing. In contrast, if the CPU 311 determines that preliminary processing can be performed (namely, if the communication speed is slower than the predetermined value (YES in step S1504)), the processing proceeds to step S1201 in FIG. 12, and the CPU 311 performs processing in step S1201 and subsequent steps.

Next, the description of the processing in FIG. 12 will be resumed.

In step S1210, if the CPU 311 determines that the CPU 311 performs preliminary processing, the processing proceeds to step S1201. In step S1201, the CPU 311 determines data to be preliminarily transmitted. More specifically, if the processing described in FIG. 12 is performed as the preliminary processing in step S503 (namely, if step S1201 is performed before the print setting screen 901 is displayed), the CPU 311 determines that the processing is preliminary processing for generating preview data. The following description will be made assuming that it is previously set that the preview data is a joint photographic experts group (jpeg) file having a resolution of 600 dots per inch (dpi). Thus, at this stage, the CPU 311 can generate conversion instruction data to be transmitted to the image processing server 105. Accordingly, the CPU 311 generates conversion instruction data indicating that the format of processed data is a jpeg format and the resolution is 600 dpi. Thus, in step S1201, the CPU 311 determines that a processing target file and the conversion instruction data are to be transmitted ("PROCESSING TARGET FILE AND CONVERSION INSTRUCTION DATA" in step S1201) and the processing proceeds to step S1202.

In step S1202, the CPU 311 transmits both of the conversion instruction data generated for a preview image and the processing target file to the image processing server 105.

Next, in step S1203, the CPU 311 receives the processed preview image from the image processing server 105 and caches the received preview image in the HDD 313.

In contrast, if the processing described in FIG. 12 is performed as the preliminary processing in step S512 (namely, if step S1201 is performed after the print setting screen 901 is displayed), the CPU 311 determines that the processing is preliminary processing for generating print data. However, to generate print data, settings such as a layout setting and a print setting need to be set by the user. In other words, until these print settings are made, conversion instruction data cannot be transmitted. Thus, in step S1201, the CPU 311 determines that only the processing target file is to be transmitted ("PROCESSING TARGET FILE" in step S1201) and the processing proceeds to step S1204.

In step S1204, the CPU 311 preliminarily transmits the processing target file to the image processing server 105. The image processing server 105 receives the processing target file and caches the received processing target file in the HDD 213.

Next, in step S1205, the CPU 311 detects the press of at least one of the PREVIEW button 706, the PRINT START button 904, and the start key 403. Next, in step S1206, the CPU 311 determines whether conversion instruction data to be transmitted to the image processing server 105 exists. More specifically, if the user presses the PRINT START button 904 or the start key 403, the CPU 311 determines to perform print processing. At this stage in step S1206, since print setting information has not yet been transmitted to the image processing server 105, the CPU 311 determines that conversion instruction data (i.e., print setting information) to be transmitted to the image processing server 105 exists (YES in step S1206), and in such a case, the processing proceeds to step S1208. In step S1208, the CPU 311 transmits the conversion instruction data including the print setting information set on the print setting screen 901 to the image processing server 105. Next, in step S1209, the CPU 311 receives processed print data from the image processing server 105, and performs printing by using the processed print data. The image processing then ends.

In contrast, if the user has pressed the PREVIEW button 706 after step S1204, conversion instruction data for a preview image has not yet been transmitted. Thus, in such a case, in step S1206, the CPU 311 determines that the conversion instruction data to be transmitted to the image processing server 105 exists (YES in step S1206). Next, in step S1208, the CPU 311 transmits the conversion instruction data indicating the format of processed data is a jpeg format and the resolution is 600 dpi to the image processing server 105. Next, in step S1209, the CPU 311 receives processed preview image from the image processing server 105 and displays the processed preview image.

If the user presses the PREVIEW button 706 after steps S1202 and S1203, the conversion instruction data for a preview image has already been transmitted. Thus, in such a case, in step S1206, the CPU 311 determines that the conversion instruction data to be transmitted to the image processing server 105 does not exist (NO in step S1206). Next, in step S1207, the CPU 311 displays a preview image cached in the HDD 313.

The processing performed between the image forming apparatus 101 and the image processing server 105 in the flowchart illustrated in FIG. 12 corresponds to the image processing sequences illustrated in FIGS. 10 and 11.

According to the first exemplary embodiment, since the image forming apparatus 101 transmits, to the image processing server 105, data that can be transmitted before the image forming apparatus 101 receives a preview instruction or a print instruction from the user, preliminary processing can be efficiently performed.

In the first exemplary embodiment, the description has been given of the example in which the sequences are dynamically switched according to the timing at which preliminary processing is performed. However, for example, in the case of a processing target file whose preview data cannot be generated without a layout specification, the processing cannot be switched by determining only the preliminary processing timing. Thus, in a second exemplary embodiment, the description will be given of an example in which the processing is switched by determining an input format.

The following description will be made assuming that an ooxml file is selected as a preliminary processing target file. A preview image of an ooxml file can be generated without a layout specification by the user. Thus, in step S1201, the CPU 311 determines that the image forming apparatus 101 transmits the processing target file and conversion instruction data. The CPU 311 performs the subsequent processing as described in the first exemplary embodiment and completes the processing for displaying a preview image. The processing performed between the image forming apparatus 101 and the image processing server 105 corresponds to the image processing sequence illustrated in FIG. 10.

In contrast, the following description will be made assuming that an ePUB file is selected as a preliminary processing target file. An ePUB is an electronic book standard and has a reflow function of automatically displaying data in an appropriate layout when a font size is specified. The image processing server 105 cannot start processing on a file in such a format, without a layout specification by the user. Thus, in step S1201, the CPU 311 determines that the image forming apparatus 101 transmits only the processing target file, and the processing proceeds to step S1204.

The CPU 311 performs preliminary processing at any one of the timings described in the first exemplary embodiment. However, in a case where an input file that needs a layout specification is to be transmitted, in step S1201, the CPU 311 determines that the data to be initially-preliminarily transmitted is only the processing target file, and the processing proceeds to step S1204. Then, in step S1204, the CPU 311 transmits only the processing target file.

Figure 14:
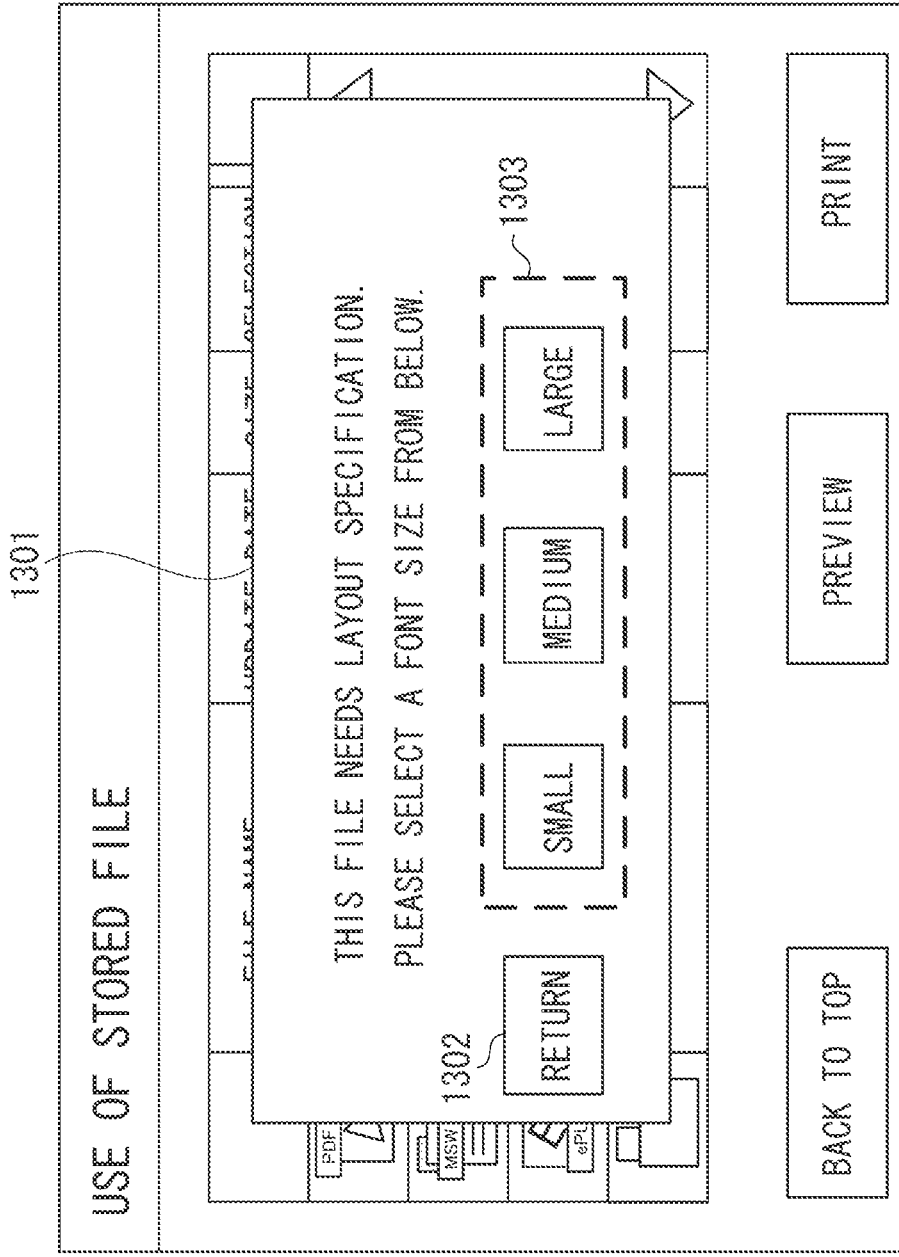
FIG. 14 illustrates an example of a popup screen for a layout specification.

Next, in step S1205, if the CPU 311 detects a preview display request from the user, since a layout specification is needed, the CPU 311 displays a popup screen 1301 for a layout specification as illustrated in FIG. 14. If the CPU 311 detects the press of a RETURN button 1302, in step S502, the CPU 311 displays the processing target file list. In contrast, if the CPU 311 detects the press of any one of layout specification buttons 1303, the CPU 311 writes a content (for example, a font size) corresponding to the pressed button in a layout setting item in the conversion instruction data. Then, in step S1208, the CPU 311 subsequently transmits only the conversion instruction data to the image processing server 105. Next, in step S1209, the CPU 311 receives processed data from the image processing server 105, and performs control so as to display a preview image of the received processed data. The processing performed between the image forming apparatus 101 and the image processing server 105 corresponds to the image processing sequence illustrated in FIG. 11. In the present exemplary embodiment, a font size is described as an example of the layout specification. However, the layout specification may be a line space size, for example.

In the second exemplary embodiment, the description has been given of the example in which the data to be initially-preliminarily transmitted is determined according to the input format. The image forming apparatus 101 switches preliminary processing sequences according to the input format in this way, whereby the image forming apparatus 101 can determine whether the processing needs conversion instruction data, when a processing target file is selected. Thus, preliminary processing can be performed more efficiently.

In a third exemplary embodiment, the description will be given of an example in which the processing sequences are switched according to the storage location of the processing target file. In the present exemplary embodiment, the description will be given of an example in which, among files in a data management area managed by the image forming apparatus 101, the CPU 311 preliminarily transmits in the background a file that cannot be processed in the image forming apparatus 101, before receiving the selection of a file storage from the user.

Figure 15:
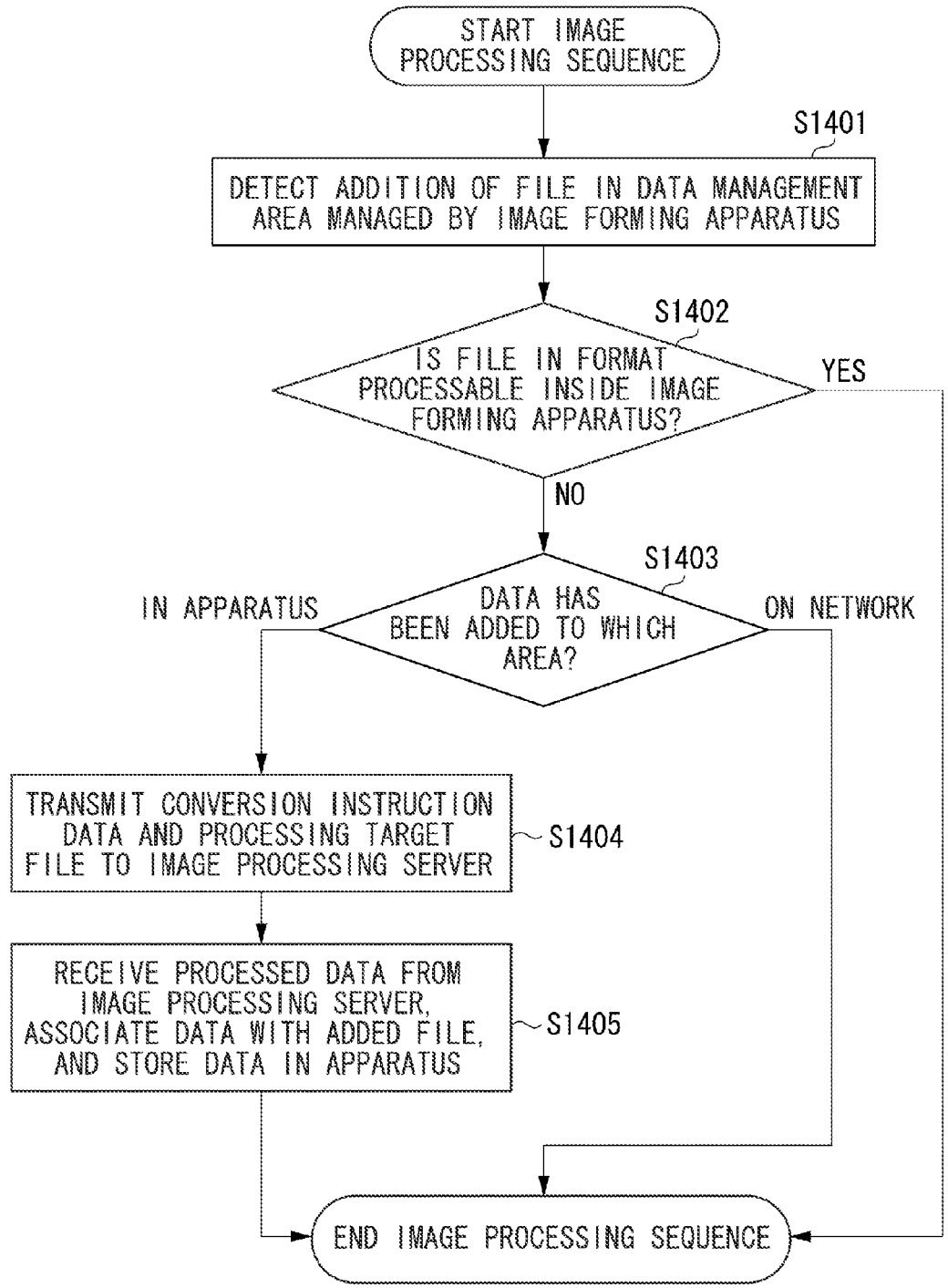
FIG. 15 is a flowchart illustrating an example of information processing performed when the image forming apparatus starts image processing in background.

FIG. 15 is a flowchart illustrating an example of information processing performed when the image forming apparatus 101 starts image processing in the background.

The CPU 311 monitors the file management area. In step S1401, the CPU 311 detects addition of a file. In step S1402, the CPU 311 determines whether the added file is in a format processable inside the image forming apparatus 101. For example, the CPU 311 determines whether the file is in a format processable inside the image forming apparatus 101, on the basis of the type of the file or the like. In step S1402, if the file is in a format processable inside the image forming apparatus 101 (YES in step S1402), the CPU 311 ends the processing illustrated in FIG. 15 without performing preliminary processing.

In contrast, in step S1402, if the file is not in a format processable inside the image forming apparatus 101 (NO in step S1402), the processing proceeds to step S1403. In step S1403, the CPU 311 checks the storage location of the file. In step S1403, if the CPU 311 determines that the file has been added in an area on a network ("ON NETWORK" in step S1403), the CPU 311 ends the processing illustrated in FIG. 15 without performing preliminary processing in the background. This is because automatically using a file on a network is not desirable in terms of security.

In contrast, in step S1403, if the CPU 311 determines that the file has been added in an area in the image forming apparatus 101 ("IN APPARATUS in step S1403), the processing proceeds to step S1404. Conversion instruction data is needed for generating image data in the background. Thus, in step S1404, the CPU 311 transmits the processing target file and conversion instruction data to the image processing server 105.

Next, in step S1405, the CPU 311 receives processed data (preview data or print data on the basis of default print setting information) from the image processing server 105, associates the received processed data with the processing target file, and stores the processed data in the HDD 313. The processing performed between the image forming apparatus 101 and the image processing server 105 corresponds to the image processing sequence illustrated in FIG. 10.

If the NETWORK button 603 is selected as a file storage, and then a processing target file is added in a network folder selected by the user, the CPU 311 may acquire the processing target file from the network and perform the preliminary processing in FIG. 12.

In the third exemplary embodiment, the description has been given of the example in which the data to be initially-preliminarily transmitted is determined according to the storage location of the processing target file. In this way, the image forming apparatus 101 switches the preliminary processing sequences according to the storage in which the processing target file is stored, whereby the image forming apparatus 101 can determine whether conversion instruction data is needed, when a file storage is selected. Thus, preliminary processing can be performed more efficiently.

In the first to third exemplary embodiments, the description has been given of the examples in which the CPU 311 preliminarily transmits a file to the image processing server 105 when the CPU 311 detects selection of a file, or in the background. However, the user does not always perform a print job or a preview display for the selected file. Consequently, for example, if the user does not use the file being preliminarily transmitted to the image processing server 105, the transmission needs to be cancelled. However, there is a possibility that the user redoes the settings and starts a job on the same file. Thus, according to a fourth exemplary embodiment, even if the CPU 311 detects de-selection or cancellation from the user, the CPU 311 does not stop the transmission but completes the transmission of the file to the image processing server 105. The transmitted file is stored in the image processing server 105. Then, if a predetermined condition is met, the CPU 311 requests the image processing server 105 to delete the transmitted file. Examples of the predetermined condition include a case where a job on a different file is performed, a case where the user logs out, and a case where a certain period of time (one hour, one day, etc.) has elapsed. However, other conditions may be used.

According to the fourth exemplary embodiment, even if the user deselects or cancels a file, the file can be stored in the image processing server 105 for a certain period of time. As a result, in a case where the user only wishes to change a setting value of the data or in the case of frequently used data, time required for transmitting an image can be reduced. Thus, preliminary processing can be performed more efficiently, compared to cases in which the present exemplary embodiment is not used.

In a fifth exemplary embodiment, if a plurality of processing target files is selected, the CPU 311 performs the following processing to avoid excessive processing load from being placed on the image processing server 105.

More specifically, the CPU 311 inquires of the image processing server 105 about the data capacity thereof available for storing files. Next, the CPU 311 acquires information about the data capacity from the image processing server 105 as a result of the inquiry. On the basis of the acquired information, the CPU 311 preliminarily transmits, to the image processing server 105, only the processing target files that are within the data capacity. When selecting a processing target file to be preliminarily transmitted, among the processing target files that are within the data capacity, the CPU 311 may preferentially select and transmit to the image processing server 105 processing target files that can be processed (printed) more quickly.

According to the fifth exemplary embodiment, even if a plurality of processing target files is selected, preliminary processing can be performed without placing excessive processing load on the image processing server 105.

Additional exemplary embodiments can also be realized by supplying a program for realizing one or more functions of the above exemplary embodiments to a system or an apparatus via a network or a storage medium and by causing at least one processor in a computer included in the system or the apparatus to read and execute the program. Alternatively, the present disclosure can also be realized by a circuit (for example, an application specific integrated circuits (ASIC)) for realizing the one or more functions of the above exemplary embodiments.

As described above, according to the above exemplary embodiments, before receiving an image processing request by an explicit instruction from a user, the image forming apparatus 101 preliminarily transmits a processing target file to the image processing server 105. As a result, time required for image transmission can be shortened. Thus, the first print output time (FPOT) until job output can be shortened and a preview image can be displayed more quickly.

In this way, even in a case where the image processing server 105, which is an example of an external apparatus, is used to perform image processing, the waiting time of the user can be reduced as much as possible, so that the operability can be improved.

According to the above exemplary embodiments, even in a case where an external apparatus is used to perform image processing, it is possible to reduce the waiting time of the user as much as possible and improve the operability.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-012725 filed Jan. 27, 2014 and Japanese Patent Application No. 2014-266251 filed Dec. 26, 2014, which are hereby incorporated by reference herein in their entirety.

What is claimed is:

1. An image forming apparatus that communicates with an external apparatus, the image forming apparatus comprising:
    an identification unit configured to identify processing target data that is not processable in the image forming apparatus;
    a transmission unit configured to transmit the processing target data to the external apparatus before reception of at least one of a print instruction and a preview display instruction with respect to the processing target data identified by the identification unit; and
    a receiving unit configured to receive processing target data that has been processed in the external apparatus,
    wherein, before reception of a preview display instruction with respect to the processing target data identified by the identification unit, the transmission unit transmits to the external apparatus both the processing target data and a processing content for the processing target data.

2. The image forming apparatus according to claim 1, further comprising a printer unit configured to print the processed processing target data received by the receiving unit.

3. The image forming apparatus according to claim 1, wherein, before reception of a print instruction with respect to the processing target data identified by the identification unit, the transmission unit transmits the processing target data to the external apparatus, and after transmitting the processing target data, transmits a processing content for the processing target data to the external apparatus.

4. The image forming apparatus according to claim 1, wherein, according to a storage location of the processing target data, the transmission unit determines whether to perform a first transmission of transmitting to the external apparatus both the processing target data and a processing content for the processing target data or a second transmission of transmitting the processing target data to the external apparatus, and after transmitting the processing target data, transmitting a processing content for the processing target data to the external apparatus.

5. The image forming apparatus according to claim 1, wherein, according to a format of the processing target data, the transmission unit determines whether to perform a first transmission of transmitting to the external apparatus both the processing target data and a processing content for the processing target data or a second transmission of transmitting the processing target data to the external apparatus, and after transmitting the processing target data, transmitting a processing content for the processing target data to the external apparatus.

6. An information processing method performed by an image forming apparatus that communicates with an external apparatus, the information processing method comprising:
    identifying processing target data that is not processable in the image forming apparatus;
    transmitting the processing target data to the external apparatus before receiving at least one of a print instruction and a preview display instruction with respect to the identified processing target data; and
    receiving processing target data that has been processed in the external apparatus,
    wherein, before receiving a preview display instruction with respect to the identified processing target data, both the processing target data and a processing content for the processing target data are transmitted to the external apparatus.

7. The information processing method according to claim 6, further comprising printing the received processed processing target data.

8. The information processing method according to claim 6, wherein, before receiving a print instruction with respect to the identified processing target data, the processing target data is transmitted to the external apparatus, and after the processing target data is transmitted, a processing content for the processing target data is transmitted to the external apparatus.

9. The information processing method according to claim 6, wherein, it is determined, according to a storage location of the processing target data, whether to perform a first transmission of transmitting to the external apparatus both the processing target data and a processing content for the processing target data or a second transmission of transmitting the processing target data to the external apparatus, and after transmitting the processing target data, transmitting a processing content for the processing target data to the external apparatus.

10. The information processing method according to claim 6, wherein, it is determined, according to a format of the processing target data, whether to perform a first transmission of transmitting to the external apparatus both the processing target data and a processing content for the processing target data or a second transmission of transmitting the processing target data to the external apparatus, and after transmitting the processing target data, transmitting a processing content for the processing target data to the external apparatus.

11. A non-transitory computer-readable storage medium storing computer executable instructions for causing a computer that communicates with an external apparatus to perform a method comprising:
    identifying processing target data that is not processable in the computer;
    transmitting the processing target data to the external apparatus before receiving at least one of a print instruction and a preview display instruction with respect to the identified processing target data; and
    receiving processing target data that has been processed in the external apparatus, wherein, before receiving a preview display instruction with respect to the identified processing target data, both the processing target data and a processing content for the processing target data are transmitted to the external apparatus.

* * * * *